March 14, 1972 R. P. WILTON ET AL 3,649,423
DECORATIVE FOOD AND BEVERAGE SERVING MEANS
Filed May 20, 1970 2 Sheets-Sheet 1

INVENTORS
RALPH P. WILTON
JOHN J. FITZPATRICK
BY
ATTORNEY

United States Patent Office 3,649,423
Patented Mar. 14, 1972

3,649,423
DECORATIVE FOOD AND BEVERAGE SERVING MEANS
Ralph P. Wilton, Wrightsville, and John J. Fitzpatrick, Hellam, Pa., assignors to Wilton Brass Company, Columbia, Pa.
Filed May 20, 1970, Ser. No. 39,082
Int. Cl. B44f 1/04; B32b 1/06
U.S. Cl. 161—5
6 Claims

ABSTRACT OF THE DISCLOSURE

Food and beverage serving means such as a table, bar counter and similar items having medallion-like decorative members resembling service plates in size which are inset permanently into the upper surface of said serving means at spaced locations adjacent one edge to denote serving areas.

CROSS-REFERENCE TO RELATED APPLICATIONS

Co-pending application, Ser. No. 830,598, now Pat. No. 3,610,175, is directed to plaque-like covering members applicable to food and beverage serving items such as tables, bar counters and the like, and to this extent, the invention described in claims herein is somewhat related to the present invention. The present invention, however, comprises a substantially different concept of food and beverage serving means from that set forth in said co-pending application.

An application filed on even date herewith also is indirectly related to the present invention and is directed to a composite service plate per se.

BACKGROUND OF THE INVENTION

For a long period of time, it has been customary, at least in the better grade of restaurants, hotels and the like, to use service plates with which tables are set at the time the guests are seated. Such service plates normally are of a highly decorated china or porcelain nature. Said plates also are sometimes formed from glass and are suitably decorated. The principal purpose of such service plate is to present an attractive appearance, which is pleasant for the guests to observe while ordering from the menu and proceeding otherwise with the preliminaries to ordering a meal. First courses, such as fruit cups, soup, and juices, which are individually served in separate dishes or glasses, are sometimes placed upon such service plate, but immediately following the consumption of no more than the first course, the service plate and the dishes or glasses in which the first course was served are removed. The main course of the meal normally is never served directly upon the service plate. Luncheon or dinner plates of a different type from said service plates are used for directly serving the main course of the meal.

Service plates are also sometimes referred to as sitdown plates, show plates, and lay plates. In general, however, it is believed that the term most usually applied to such article is service plate. The persent invention therefore is intended to encompass the other names to which service plates are sometimes referred.

Conventional china and glass service plates, which normally are of a somewhat fragile and highly decorated nature, are subject to breakage during normal handling thereof and especially during washing of the same. Further, such plates usually are much more expensive than conventional luncheon and dinner plates, due primarily to the highly decorative nature thereof. Also, since the same are primarily for decorative and esthetic purposes, they amount to surplusage as far as actually serving a meal is concerned. Handling of the same also consumes additional time on the part of a waiter or waitress, as well as the staff employed in the dishwashing facility. Service plates of typical type also normally are somewhat considered to be a luxury and thus, are used only when tablecloths are used upon the table where the meal is being served. Cloth or linen napkins likewise are a necessity under the circumstances and incur the additional expense of laundering after each use.

SUMMARY OF THE INVENTION

It is the principal object of the present invention to provide food and beverage serving means which may comprise several types of tables, bar counters or the like, upon which food and beverage are served, in combination with panel-type members of an ornamental character which resemble service plates in size and are inset into recesses formed in the food and beverage serving surface of the table or bar counter, for example, said panel-type members being permanently connected to such serving member while resembling a serving plate in appearance but requiring no handling thereof, with the possible exception of a light wiping action at the completion of serving a meal or beverage, and thereby eliminating the need for tablecloths, placemats, or other corresponding means normally employed when conventional service plates are used for serving food and beverages.

It is another object of the invention to recess such panel-type members into the surface of the food and beverage serving member to a depth preferably at least equal to the thickness of said panel-type member, whereby the upper, ornamental surface thereof is substantially flush with the adjacent surface of the serving member without detracting from the intended purpose of the panel-type member, largely giving the appearance of a service plate as far as esthetics and a feeling of well-being is concerned.

It is a further object of the invention to form the outline of the recess in the serving member which receives the panel-type member so as to be closely complementary to the shape of the panel-type member but provide a slight clearance space between the sidewalls of the recess and the periphery of the panel-type member, whereby sealing material may be inserted within said space to prevent spilled food, beverage, water, or wiping or polishing fluids from entering said space, the panel-type members also preferably being permanently affixed in said receses by durable cement of a nature which will firmly adhere unlike substances together, said cement also being protected from contact by extraneous material in view of the use of said sealing material.

It is another object of the invention to employ panel-type members which may be formed with embossed or intaglio designs which cover at least a substantial portion of the upper surface of said members, said designs preferably being formed incident to casting or molding the panel-type members, whereby, except for limited finishing operations, the design is completed when the panel-type members are removed from the molds.

It is still another object of the invention to form said panel-type members from a material different from that of the food and beverage serving member so as to present an effective and ornamental contrast which highlights in particular the design upon the panel-type members.

It is a further object of the invention to transversely space the panel-type members from each other upon the food and beverage serving member so as to designate the location of each place where a guest is intended to be served and thereby not only enhance the decorative nature of the panel-type members in relation to the food and beverage serving member but also serve a utilitarian purpose.

DESCRIPTION OF THE PREFERRED EMBODIMENTS

Figure 1:
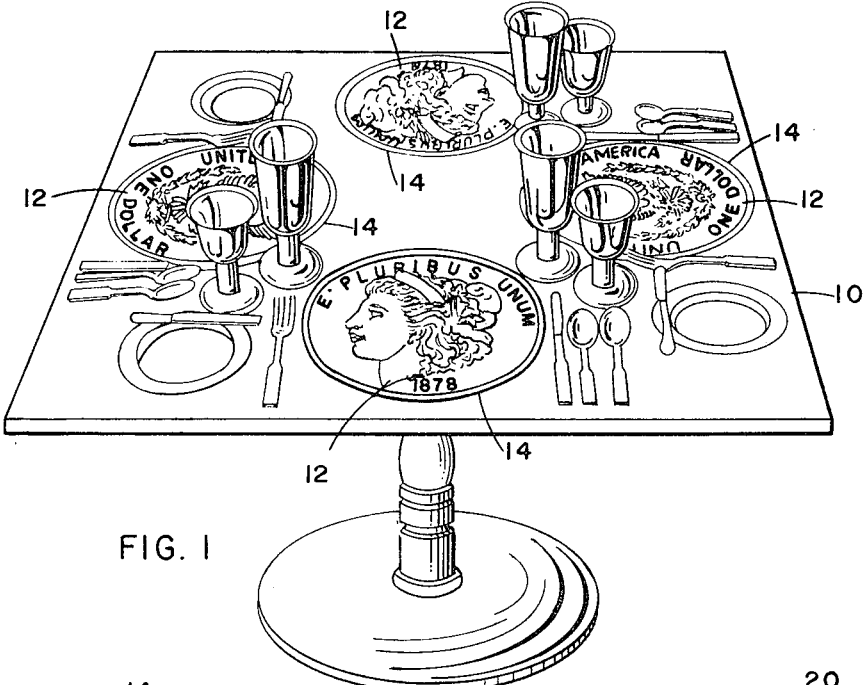
FIG. 1 is a perspective view of an exemplary table comprising a food and beverage serving member into the upper surface of which a plurality of panel-type members are inset to resemble service plates.

Referring to FIG. 1, an exemplary table 10 is shown to represent a food and beverage serving member in accordance with the principles of the present invention. Arranged within the upper surface of said table 10 are a plurality of panel-type members 12. As will be seen from FIG. 3, the panel-type members are each inset within a complimentary recess 14 to a sufficient depth that the upper surface 16 of the panel-type member 12 is substantially flush with the portion of the upper surface 18 of the serving member 10, which is adjacent to the perimeter of the recess 14.

The upper surface 16 of each panel-type member 12 preferably has a design formed therein of an ornamental and attractive nature. Such design may be either entirely embossed or intaglio, or portions of each may be embossed or intaglio, as desired. Such design preferably is formed by casting or molding the panel-type members 12 in an appropriate mold which is formed by using a pattern having a complimentary design thereon formed, for example, by the process comprising the subject matter of prior Pat. 3,277,541.

Figure 4:
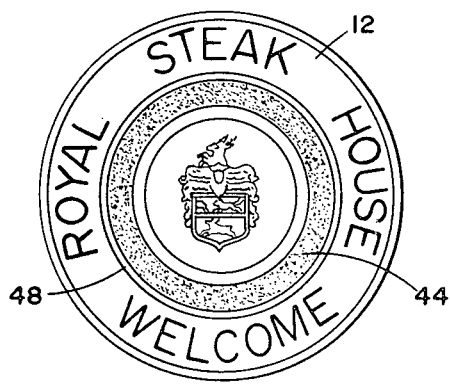
FIG. 4 is a further exemplary design and arrangement of panel-type member.

The members 12 may be formed either entirely from a substantial range of different materials, including various types of metals, ceramics, synthetic resins or plastics, glass or wood, or they may be of a composite nature as shown in exemplary manner in FIG. 4. Particularly where the decorative upper surface 16 is formed by casting or molding a desired material selected from the foregoing class, or otherwise, when the molded or cast articles are moved from the mold, except for limited finishing operations, such panel-type member is complete and is otherwise in condition to be inset into the recess 14 provided therefor in a desired food and beverage serving member 10.

Figure 2:
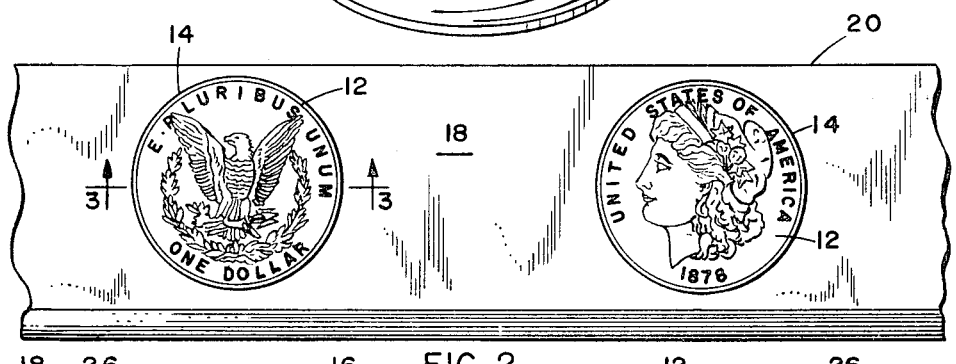
FIG. 2 is a fragmentary top plan view of a section of a bar counter comprising a food and beverage serving member into the upper surface of which a plurality of panel-type members have been inset in transversely spaced relationship, in accordance with the principles of the invention, to serve as permanently installed service plates.

Referring to FIG. 2, a fragmentary, exemplary plan view of a bar counter 20 is illustrated in which recesses 14 are formed at transversely spaced intervals to receive panel-type members 12 similar to those illustrated in FIG. 1, for example. Such panel-type members 12 have a number of purposes when used either in table service, such as in exemplary table 10, shown in FIG. 1, or in bar counter service 20, as shown in FIG. 2. The primary purpose is to present a decorative and ornamental effect similar to that produced by the use of conventional service plates. Another purpose is to designate the location of a certain serving area for an individual patron.

Depending upon the size of the table, a square table, such as shown in FIG. 1, of moderate size normally is intended to seat four patrons and thus, a panel-type members 12 is positioned midway adjacent each of the sides of the table 10. In the bar counter 20, however, the panel-type members are positioned transversely apart a distance which will suitably provide each individual patron with adequate room to enjoy their beverage and food. Still another object is to eliminate the need for a tablecloth or placemats without detracting from the esthetic appearance of the entire serving surface. Moreover, by not using a tablecloth or placemat, the beauty of the top of the table 10 or bar counter 20 is visible and thereby adds to the overall attractiveness and esthetic appeal of the serving area.

In selecting a desired material from which the panel-type members 12 are to be molded or cast, or otherwise formed, such as by blanking and stamping or pressing, it is preferred that the material be in harmonious contract with a material from which the serving surface of the table 10 or counter 20 are formed. The panel-type members 12 also may be appropriately colored, especially if formed from suitable ceramic material, glass, or synthetic resins.

The design formed upon the upper surface 16 of such members 12 may be vari-colored, if desired and result from either multi-color printing, decals, hand-painting or coloring or otherwise, such as by being of a composite nature, either of different portions being of different material nested together or of similar materials of different colors. Under circumstances where a selected metal is used, it may be either highly polished or suitably coated to preserve the polish.

Polished copper or bronze, for example, are highly suitable. In addition, certain types of silver-colored alloys, which may comprise a large proportion of aluminum or the like, likewise are suitable and when highly polished in particular, are most attractive, especially when the designs, words, mottos, or other items which may be molded or cast thereinto are of an embossed nature so that the upper surface of the design is disposed at a level above the lower-most surfaces of the design. Still another manner of forming an esthetic and pleasing design, especially where the members 12 are formed from metal, is to apply an enamel-type design of one or more colors by appropriate processes and fire the same to vitrify the enamel and stabilize it.

Figure 3:
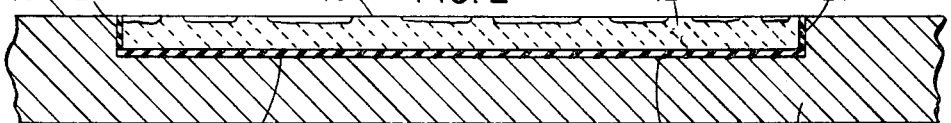
FIG. 3 is an enlarged fragmentary vertical sectional view showing relative proportions and an exemplary preferred manner of affixing a panel-type member within the recess formed in the food and beverage serving member as seen on the lines 3—3 of FIG. 2.

The panel-type members 12 preferably are permanently secured within the recesses 14 by an appropriate cement, an exemplary layer 24 of which is shown as being applied to the bottom surface of recess 14 in FIG. 3. For example, an industrial or commercial type epoxy cement is highly suitable for such purpose because of its ability to adhere firmly to a very wide range of different materials and substances, including those described above as possible materials from which the panel-type members 12 may be formed. Similarly, table tops and bar counters most frequently are formed from wood and such types of cement readily adhere to wood and other similar materials from which tables and bar counters conventionally are made. The table or bar tops also may be covered with appropriate finishing materials such as varnishes or lacquers, as well as a layer of commercial material of a resin nature, such as "Formica" and the like, which further adds to the esthetic effect.

The sidewalls of the recess 14 preferably are spaced slightly from the peripheries of the panel-type members 12 so as to permit ready reception of the members 12. In addition, the crevice produced by such space between the recess walls and periphery of the members 12 is suitable to receive a suitable band of self-curing sealing material 26 or the like. Various types of commercial rubberlike sealing materials are available which adhere firmly to both substances between which the material is inserted. Such material is sometimes referred to as grout. In its initial condition, it is plastic or fluid and readily may be inserted within the crevices referred to. The upper surface may be smoothly wiped or troweled to remove excess, and the upper edge of such material which is exposed to atmosphere soon cures so that it is no longer plastic or tacky. Typical examples of such material comprise the subject matter of the following patents: Nos. 2,258,220; 2,258,221; and 2,258,222 all issued Oct. 7, 1941; and Patent No. 2,442,059, issued May 25, 1948.

Therefore, the sealing material will not interfere with normal use of the members 12 when serving as service plates so as to produce all of the normal esthetic effects thereof but nevertheless being of a permanent nature and thereby minimizing the expense of servicing the same. Normally, a damp cloth is all that is necessary to wipe the tabletop or counter surface and the members 12 after each use thereof. The sealing material 26 prevents any food, beverage or water, which is accidentally spilled, from passing around the edge of the members 12 or otherwise entering the recess 14 within which the members 12 are securely mounted.

In view of the fact that the adhesive or cement 24 preferably extends across the entire bottom surface of the recesses 14, and thus firmly adheres the lower surface of the panel-type members 12 to such bottom surface of the recess, it will be seen that such arrangement adds substantial strength to the members 12, especially when formed from frangible material such as ceramic materials of various kinds, glass, and the like. Thus, the recess and the cemented adherence of the member 12 to the bottom surface thereof produces a composite reinforcing effect for the members 12.

Figure 5:
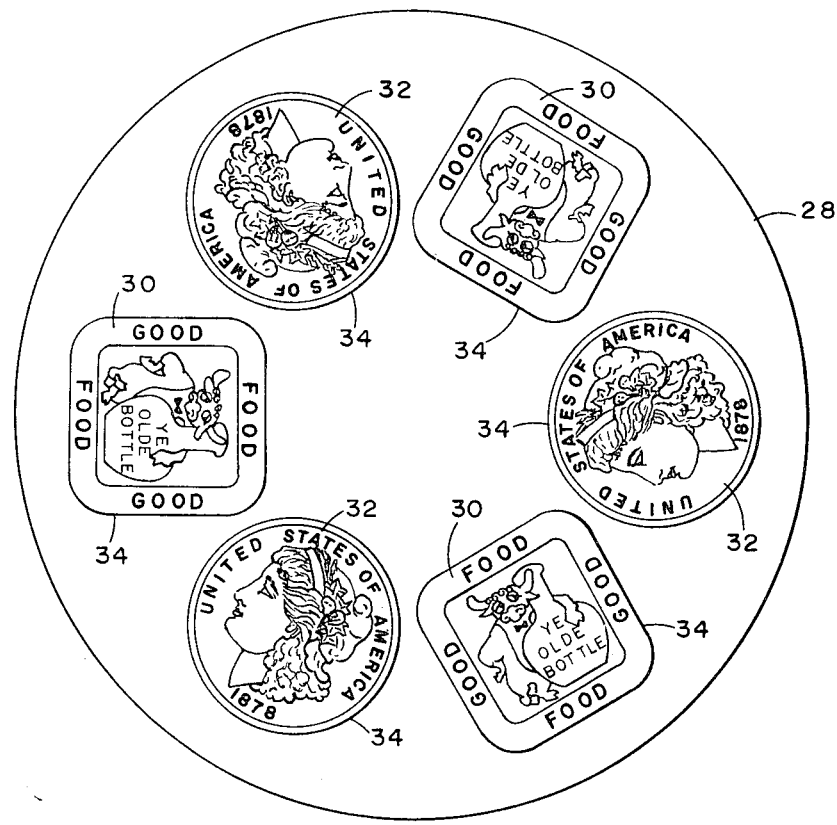
FIG. 5 is a top plan view of another example of a table comprising a food and beverage serving member in which a plurality of panel-type members of different shapes have been inset to serve in the capacity of service plates for both esthetic and utilitarian purposes.
Figure 6:
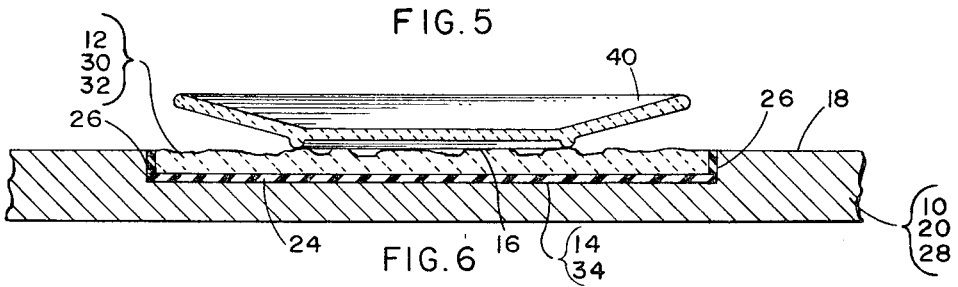
FIG. 6 is a view similar to FIG. 3 but additionally illustrating a conventional dinner plate disposed upon the somewhat exaggerated sectional view of a panel-type member inset into a recess in a food and beverage serving member to provide approximate exemplary proportions of size between such normal dinner plate and panel-type member.
Figures 7, 8:
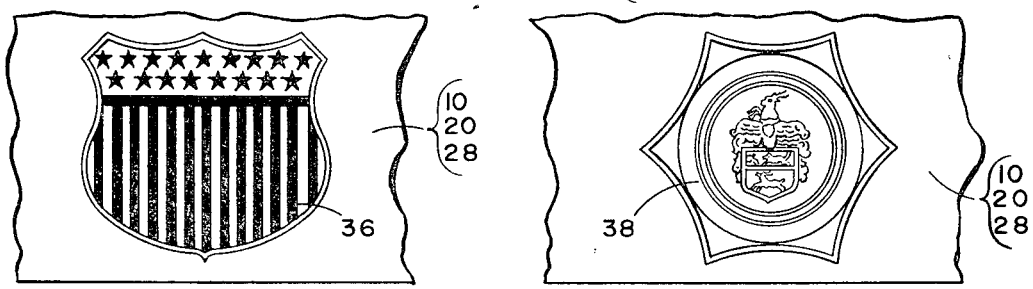
FIGS. 7 and 8 are fragmentary plan views, illustrating portions of a food and beverage serving member, in which different exemplary shapes and designs of panel-type members from those shown in the preceding figures are inset in accordance with the principles of the present invention.

Referring to FIG. 5, it will be seen that another shape of table 28 is illustrated in which a plurality of different shapes of panel-type members 30 and 32 are disposed within recesses 34 respectively complementary thereto and which are of a depth similar to the recess 14, illustrated in FIGS. 3 and 6, for example. Accordingly, it will be seen that while circular members 12 were illustrated in FIGS. 1 and 2, such members are not restricted to being formed in a circular configuration, but may comprise various shapes and embody various desired designs, several additional exemplary shapes and designs of panel-type members 36 and 38, respectively, are illustrated in FIG. 7 and FIG. 8 and may be used in any of the exemplary tables 10 and 28 or bar counter 20, shown in the preceding figures. It will be understood that the recess to receive any desired shape and design of panel-type member will be complementary thereto, and preferably, slightly larger so as to provide a peripheral crevice within which sealing material 26 may be disposed to enhance and protect the cement 24 within the bottom of each recess.

In order to illustrate an exemplary proportion of the relative sizes of the panel-type members 12 or otherwise with respect to a conventional average size of dinner plate 40, attention is directed to FIG. 6 in which such exemplary illustration of a dinner plate is shown in transverse sectional manner. Such proportion is not intended to be restrictive, however, and is merely illustrative, it being understood that, in general, the panel-type members 12, 30, 32, 36 and 38, which comprise a substitute for conventional service plates, will be slightly larger than a normal dinner plate or other type of plate upon which food is directly served, such as under circumstances where conventional service plates are used.

Figure 9:
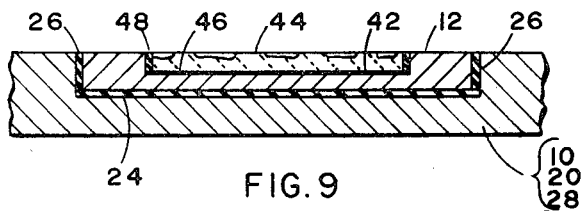
FIG. 9 is a fragmentary sectional view of a composite type of panel type member illustrated in recessed position within a food and beverage serving member.

A further artistic and esthetic effect may be achieved by forming the panel-type members 12 in composite manner from a plurality of different materials or finished effects. By referring to FIG. 9, it will be seen that the member 12 is formed with one or more shallow recesses 42, of any desired shape. An inset member 44 of complementary shape and formed either with or without a design on the upper surface thereof, and of contrasting nature to the member 12 and of a different material therefrom is positioned within and secured to the bottom of said recess by cement 46. An exemplary arrangement of this type also is shown in FIG. 4. The inset also is surrounded by grout 48 to complete the sealing of the inset in recess 42. Another possible concept is to arrange a circle or other pattern of a plurality of such insets within corresponding recesses in member 12. Still further, the inset member 44 may have supplemental insets of decorative nature mounted therein within suitable recesses.

From the foregoing, it will thus be seen that the present invention provides a combination food and beverage serving means, which essentially comprises a food and beverage serving member, such as table of appropriate type, bar counter, or otherwise, in the upper surfaces of which recesses are formed to receive decorative and ornamental panel-type members 12, etc., which are formed from any one of a number of different types of suitable material, or a combination of such materials, the upper surface of the panel-type member preferably being substantially flush with the adjacent surface of the food and beverage serving member.

Due to the design, contract in color of the panel-type member with the adjacent areas of the table or bar counter surfaces, and particularly in view of the ornamentation formed upon or applied at least to the upper surface of such panel-type members, the food and beverage serving means and the surface thereof in particular is beautified at surprisingly low cost, particularly in contrast to the cost of expensive service plates and the attending servicing cost thereof. Similarly, the atmosphere of an otherwise conventional table or bar counter is greatly enhanced and elevated in view of such panel-type inset members reesmbling attractive, ornamental and esthetic service plates. In addition, there is no need to use tablecloths or placemats and the servicing cost of these likewise is saved.

While the invention has been described and illustrated in its several preferred embodiments, it should be understood that the invention is not to be limited to the precise details herein illustrated and described since the same may be carried out in other ways falling within the scope of the invention as illustrated and described.

What is claimed is:

1. Decorative food and beverage serving means comprising a planar base serving member of the class of tables and counters upon which service plates are used at locations thereon where customers are served by placing conventional food serving dishes thereon, said base serving member having a plurality of recesses of predetermined depth formed therein at locations spaced transversely from each other and of generally similar cross-sectional dimensions, and panel type members having designs thereon and of a size and design at least suggesting service plates which are complementary to said recesses in said base member and secured therein against at least accidental removal, said panel type members having a thickness at least equal to the depth of said recesses and each adapted to support a food serving plate upon the upper surface thereof.

2. The serving means according to claim 1 in which said panel-type members have sealing means extending around the periphery of each to prevent the passage of extraneous material into said recesses.

3. The serving means according to claim 2 in which said sealing means is a rubber-like permanent material and the panel-type members are affixed within said recesses in said serving member by cement applied to adjacent surfaces of said recesses and members.

4. The serving means according to claim 1 in which said panel-type members have embossed designs on the upper surface thereof.

5. The serving means according to claim 4 in which the upper surfaces of said designs of said panel-type members are substantially no higher than the adjacent surface of said serving member.

6. The serving means according to claim 1 in which said serving member is formed from wood, said panel-type member is formed from metal and has a shallow recess therein concentric therewith, and an ornamental ceramic inset is secured within said recess in said panel-type member with the upper surface thereof no higher than that of said panel-type member and contrasting esthetically therewith.

References Cited

UNITED STATES PATENTS

| | | | |
|---|---|---|---|
| 2,143,744 | 1/1939 | Sohn | 161—7 |
| 3,212,952 | 10/1965 | Turner | 161—5 |
| 3,438,838 | 4/1969 | Pellicer et al. | 161—5 |
| 3,277,541 | 10/1966 | Wilton et. al. | 156—8 |
| 2,358,720 | 9/1944 | Larmour | 161—39 |

FOREIGN PATENTS 572,049   9/1945   Great Britain _____ 108—161

PHILIP DIER, Primary Examiner

U.S. Cl. X.R.

108—161; 156—297; 161—18, 39